(12) United States Patent
Fanello et al.

(10) Patent No.: US 9,886,652 B2
(45) Date of Patent: Feb. 6, 2018

(54) COMPUTERIZED CORRESPONDENCE ESTIMATION USING DISTINCTIVELY MATCHED PATCHES

(71) Applicant: Microsoft Technology Licensing, LLC, Redmond, WA (US)

(72) Inventors: Sean Ryan Francesco Fanello, Bellevue, WA (US); Shahram Izadi, Bellevue, WA (US); Pushmeet Kohli, Bellevue, WA (US); Christoph Rhemann, Bellevue, WA (US); Shenlong Wang, Toronto (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 148 days.

(21) Appl. No.: 15/071,111

(22) Filed: Mar. 15, 2016

(65) Prior Publication Data

US 2017/0270390 A1    Sep. 21, 2017

(51) Int. Cl.
 *G06K 9/62*    (2006.01)

(52) U.S. Cl.
 CPC ......... *G06K 9/6282* (2013.01); *G06K 9/6256* (2013.01)

(58) Field of Classification Search
 CPC .. G06K 9/6282; G06K 9/6256; G06K 9/4609; G06K 9/4652; G06K 9/4671; G06K 9/6202; G06K 9/6203; G06K 9/68; G06T 11/60; G06T 7/337
 See application file for complete search history.

(56) References Cited

U.S. PATENT DOCUMENTS

| | | |
|---|---|---|
| 6,215,503 B1 | 4/2001 | Snyder et al. |
| 7,382,897 B2 | 6/2008 | Brown et al. |
| 8,811,749 B1 | 8/2014 | Barnes et al. |
| 8,861,868 B2 | 10/2014 | Shechtman et al. |
| 2016/0180157 A1* | 6/2016 | Alcoverro Vidal ............ G06K 9/00201 382/103 |

(Continued)

OTHER PUBLICATIONS

Anonymous, "Effecient Course-to-Fine PatchMatch for Large Displacement Optical Flow—CPM-Flow", The KITTI Vision Benchmark Suite, Submitted Nov. 3, 2015, retrieved Mar. 7, 2016, 29 pgs.

(Continued)

*Primary Examiner* — Phuoc Tran
(74) *Attorney, Agent, or Firm* — Drinker Biddle & Reath LLP

(57) ABSTRACT

Correspondences in content items may be determined using a trained decision tree to detect distinctive matches between portions of content items. The techniques described include determining a first group of patches associated with a first content item and processing a first patch based at least partly on causing the first patch to move through a decision tree, and determining a second group of patches associated with a second content item and processing a second patch based at least partly on causing the second patch to move through the decision tree. The techniques described include determining that the first patch and the second patch are associated with a same leaf node of the decision tree and determining that the first patch and the second patch are corresponding patches based at least partly on determining that the first patch and the second patch are associated with the same leaf node.

20 Claims, 5 Drawing Sheets

(56) References Cited

U.S. PATENT DOCUMENTS

2016/0328841 A1* 11/2016 Lay .................. G06T 7/0012

OTHER PUBLICATIONS

Bailer, et al., "Flow Fields: Dense Correspondence Fields for Highly Accurate Large Displacement Optical Flow Estimation", In Proceedings of IEEE International Conference on Computer Vision, Dec. 13, 2015, pp. 4015-4023.

Bao, et al., "Fast Edge-Preserving PatchMatch for Large Displacement Optical Flow", In Journal of IEEE Transactions on Image Processing, vol. 23, Issue 12, Dec. 2014, pp. 4996-5006.

Barnes, et al., "The Generalized PatchMatch Correspondence Algorithm", In Proceedings of 11th European Conference on Computer Vision, Sep. 5, 2010, pp. 1-14.

Belongie, et al., "Shape Matching and Object Recognition using Shape Contexts", In Journal of IEEE Transactions on Pattern Analysis and Machine Intelligence, vol. 24, Issue 4, Apr. 2002, pp. 509-522.

Bleyer, et al., "PatchMatch Stereo—Stereo Matching with Slanted Support Windows", In Proceedings of British Machine Vision Conference, Aug. 29, 2011, pp. 1-11.

Bosch, et al., "Image Classification using Random Forests and Ferns", In Proceedings of IEEE 11th International Conference on Computer Vision, Oct. 14, 2007, 8 pages.

Bristow, et al., "Dense Semantic Correspondence Where Every Pixel is a Classifier", In Proceedings of IEEE International Conference on Computer Vision, Dec. 13, 2015, pp. 4024-4031.

Brox, et al., "Large Displacement Optical Flow: Descriptor Matching in Variational Motion Estimation", In Journal of IEEE Transactions on Pattern Analysis and Machine Intelligence, vol. 33, Issue 3, Mar. 2011, pp. 1-14.

Butler, et al., "A Naturalistic Open Source Movie for Optical Flow Evaluation", In Proceedings of 12th European Conference on Computer Vision, Oct. 7, 2012, pp. 611-625.

Chen, et al., "Large Displacement Optical Flow from Nearest Neighbor Fields", In Proceedings of IEEE Conference on Computer Vision and Pattern Recognition, Jun. 23, 2013, pp. 2443-2450.

Criminisi, et al., "Decision Forests: A Unified Framework for Classification, Regression, Density Estimation, Manifold Learning and Semi-Supervised Learning", In Journal of Foundations and Trends in Computer Graphics and Vision, vol. 7, Issue 2-3, Mar. 29, 2012, 150 pages.

Datar, et al., "Locality-Sensitive Hashing Scheme Based on p-Stable Distributions", In Proceedings of Twentieth Annual Symposium on Computational Geometry, Jun. 9, 2004, pp. 253-262.

Draver, et al., "Combinatorial Regularization of Descriptor Matching for Optical Flow Estimation", In Proceedings of 26th British Machine Vision Conference, Sep. 7, 2015, pp. 1-12.

Fanello, et al., "Filter Forests for Learning Data-Dependent Convolutional Kernels", In Proceedings of IEEE Conference on Computer Vision and Pattern Recognition, Jun. 24, 2014, 8 pages.

Fischer, et al., "FlowNet: Learning Optical Flow with Convolutional Networks", In Proceedings of IEEE International Conference on Computer Vision, Dec. 13, 2015, pp. 2758-2766.

Frahm, et al., "Fast Robust Large-scale Mapping from Video and Internet Photo Collections", In Journal of International Society for Photogrammetry and Remote Sensing, vol. 65, Issue 6, Aug. 7, 2010, pp. 1-47.

He, et al., "Computing Nearest-Neighbor Fields via Propagation-Assisted KD-Trees", In Proceedings of IEEE Conference on Computer Vision and Pattern Recognition, Jun. 16, 2012, pp. 111-118.

Kennedy, et al., "Optical Flow with Geometric Occlusion Estimation and Fusion of Multiple Frames", In Proceedings of 10th International Conference on Energy Minimization Methods in Computer Vision and Pattern Recognition, Jan. 13, 2015, pp. 1-14.

Kitt, et al., "Visual Odometry based on Stereo Image Sequences with RANSAC-based Outlier Rejection Scheme", In Proceedings of IEEE Intelligent Vehicles Symposium IV, Jun. 21, 2010, 7 pages.

Kontschieder, et al., "Context-Sensitive Decision Forests for Object Detection", In Proceedings of Twenty-sixth Annual Conference on Neural Information Processing Systems, Dec. 3, 2012, pp. 1-9.

Korman, et al., "Coherency Sensitive Hashing", In Proceedings of International Conference on Computer Vision, Nov. 6, 2011, 8 pages.

Ladicky, et al., "Learning the Matching Function", In Journal of Computing Research Repository, Feb. 2015, pp. 1-9.

Lowe, David G., "Object Recognition from Local Scale-Invariant Features", In Proceedings of the International Conference on Computer Vision, vol. 2, Sep. 20, 1999, pp. 1-8.

Menze et al, "Discrete Optimization for Optical Flow", Book Pattern Recognition, vol. 9358 of the series Lecture Notes in Computer Science, Nov. 3, 2015, 12 pgs.

Revaud, et al., "Epic Flow: Edge-Preserving Interpolation of Correspondences for Optical Flow", In Proceedings of IEEE Conference on Computer Vision and Pattern Recognition, Jun. 7, 2015, pp. 1-11.

Roth, et al., "On the Spatial Statistics of Optical Flow", In International Journal of Computer Vision, vol. 74, Issue 1, Aug. 2007, 29 pages.

Sellent, et al., "Quality Assessment of Non-Dense Image Correspondences", In Proceedings of 12th European Conference on Computer Vision, Oct. 7, 2012, pp. 1-10.

Shotton, et al., "Real-Time Human Pose Recognition in Parts from a Single Depth Image", In Proceedings of IEEE Conference on Computer Vision and Pattern Recognition, Jun. 20, 2011, 8 pages.

Simo-Serra, et al., "Discriminative Learning of Deep Convolutional Feature Point Descriptors", In Proceedings of the International Conference on Computer Vision, Dec. 13, 2015, 9 pages.

Simonyan, et al., "Learning Local Feature Descriptors Using Convex Optimisation", In Journal of IEEE Transactions on Pattern Analysis and Machine Intelligence, vol. 36, No. 8, Aug. 2014, pp. 1-14.

Singh, et al., "Unsupervised Discovery of Mid-Level Discriminative Patches", In Proceedings of 12th European Conference on Computer Vision, Oct. 7, 2012, pp. 1-14.

Strecha, et al., "LDAHash: Improved Matching with Smaller Descriptors", In Journal of IEEE Transactions on Pattern Analysis and Machine Intelligence, vol. 34, Issue 1, Jan. 2012, pp. 66-78.

Sun, et al., "Secrets of Optical Flow Estimation and Their Principles", In Proceedings of IEEE Conference on Computer Vision and Pattern Recognition, Jun. 13, 2010, pp. 2432-2439.

Tola, et al., "DAISY: An Efficient Dense Descriptor Applied to Wide-Baseline Stereo", In Journal of IEEE Transactions on Pattern Analysis and Machine Intelligence, vol. 32, Issue 5, May 2010, pp. 815-830.

Trzcinski, et al., "Boosting Binary Keypoint Descriptors", In Proceedings of IEEE Conference on Computer Vision and Pattern Recognition, Jun. 23, 2013, 8 pages.

Wei, et al., "Fast Texture Synthesis using Tree-Structured Vector Quantization", In Proceedings of 27th Annual Conference on Computer Graphics and Interactive Techniques, Jul. 23, 2000, pp. 479-488.

Weinzaepfel, et al., "DeepFlow: Large Displacement Optical Flow with Deep Matching", In Proceedings of IEEE International Conference on Computer Vision, Dec. 3, 2013, 9 pages.

Xu, et al., "Motion Detail Preserving Optical Flow Estimation", In Journal of IEEE Transactions on Pattern Analysis and Machine Intelligence, vol. 34, Issue 9, Sep. 2012, pp. 1744-1757.

Zagoruyko, et al., "Learning to Compare Image Patches via Convolutional Neural Networks", In Proceedings of IEEE Conference on Computer Vision and Pattern Recognition, Jun. 7, 2015, pp. 4353-4361.

Zbontar, et al., "Computing the Stereo Matching Cost with a Convolutional Neural Network", In Proceedings of IEEE Conference on Computer Vision and Pattern Recognition, Jun. 7, 2015, 8 pages.

* cited by examiner

COMPUTERIZED CORRESPONDENCE ESTIMATION USING DISTINCTIVELY MATCHED PATCHES

BACKGROUND

Various computer vision tasks including camera pose estimation, tracking, multi-view stereo estimation, structure-from-motion determination, co-segmentation, retrieval, compression, etc., call for identifying parts of a first image that correspond to parts of a second image. Determining corresponding parts of a first image and a second image is referred to as correspondence estimation, or the task of estimating how parts of visual signals (e.g., images or volumes) correspond to each other.

Current techniques for determining correspondence between visual signals include modelling photometric and geometric transformations (e.g., occlusions, large displacements, viewpoints, shading, illumination change, etc.) and leveraging the determined models to infer correspondence. For example, a popular approach for determining correspondence between visual signals includes detecting interest or salient points in a visual signal (e.g., image or volume), and matching the interest or salient points to interest or salient points in another visual signal (e.g., image or volume) based on measuring the Euclidean distance using descriptors that are designed to be invariant to certain classes of transformations. While these current technologies can generate accurate matches, the computational complexity of matching potential interest points restricts the applicability of the current technologies to a small number of key-points. That is, the computational complexity limits the scalability of current techniques.

SUMMARY

This disclosure describes determining correspondences (e.g., global point-wise correspondences) in content items utilizing a trained model, such as a decision tree, to detect distinctive matches between portions of content items. In some examples, the techniques described herein include determining a first group of patches associated with a first content item and processing a first patch based at least partly on causing the first patch to move through a decision tree. Furthermore, the techniques described herein can include determining a second group of patches associated with a second content item and processing a second patch based at least partly on causing the second patch to move through the decision tree. Based at least in part on determining that the first patch and the second patch are associated with a same leaf of the decision tree, the first patch and the second patch may be determined to be corresponding patches. Techniques described herein conserve computational resources by determining correspondence between content items with linear complexity relating to a number of pixels associated with the content items. The techniques described herein determine correspondence without pairwise comparisons or key-point detection, enabling the techniques described herein to determine correspondence more efficiently than conventional approaches.

Furthermore, this disclosure describes training a model, such as a decision tree, to detect distinctive matches between portions of content items. The techniques described herein include accessing training content items and training a model for mapping at least two patches extracted from the training content items that are in correspondence to a same terminal node of the model and separating the at least two patches from other patches extracted from the training content items that are not in correspondence. The training can include determining parameters for an individual node of a plurality of nodes of the model that maximize a weighted harmonic mean between precision and recall, determining, based at least in part on the parameters, a threshold for individual layers of nodes of the plurality of nodes, and training the model based at least in part on the parameters and the threshold.

This Summary is provided to introduce a selection of concepts in a simplified form that are further described below in the Detailed Description. This Summary is not intended to identify key or essential features of the claimed subject matter, nor is it intended to be used to limit the scope of the claimed subject matter.

BRIEF DESCRIPTION OF THE DRAWINGS

The Detailed Description is set forth with reference to the accompanying figures, in which the left-most digit of a reference number identifies the figure in which the reference number first appears. The use of the same reference numbers in the same or different figures indicates similar or identical items or features.

DETAILED DESCRIPTION

Figure 1:
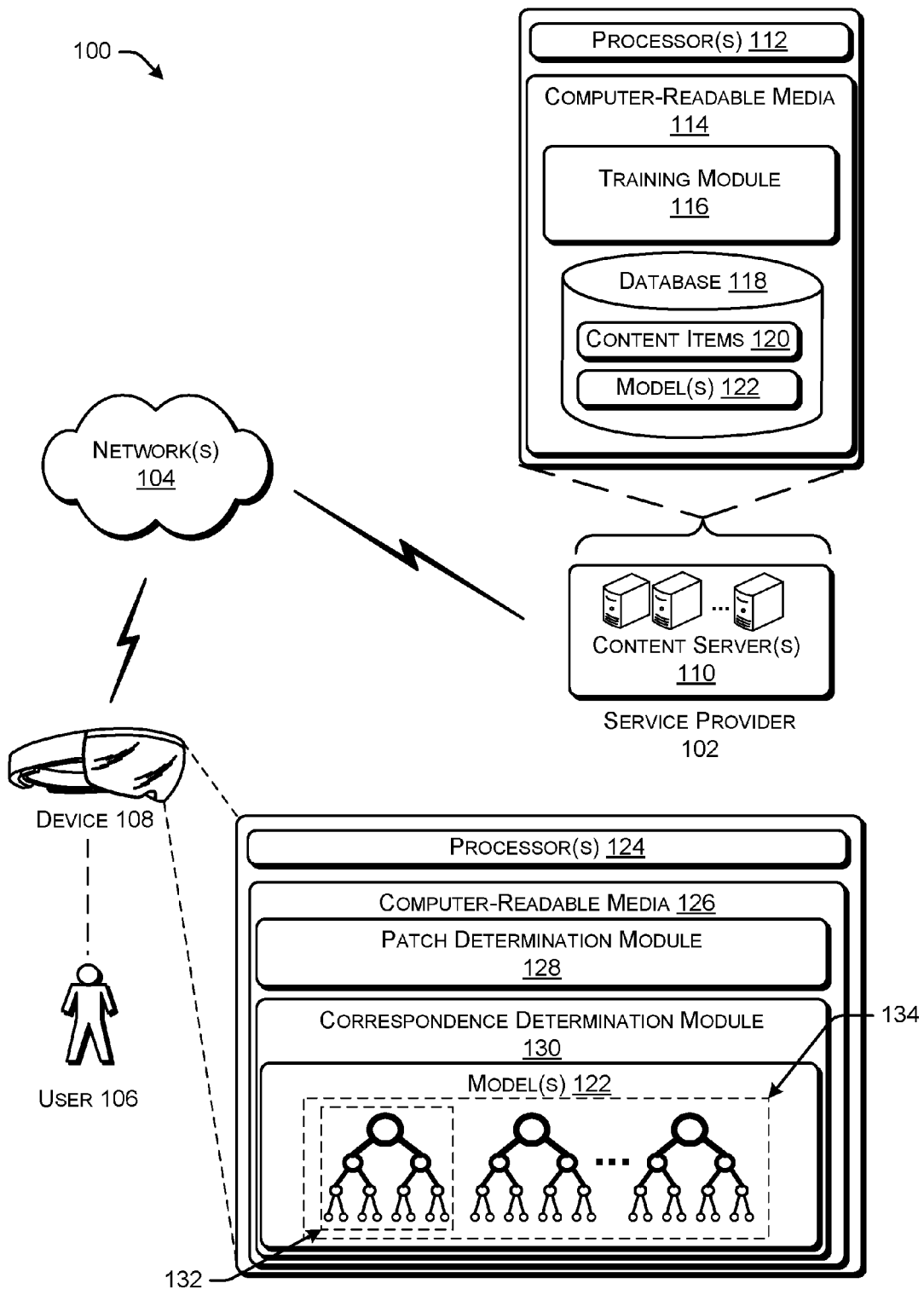
FIG. 1 is a schematic diagram showing an example environment for training a model for determining distinctive matches between content items and utilizing the trained model to determine correspondences between content items based at least in part on the distinctive matches determined by the trained model.

This disclosure describes determining correspondences (e.g., global point-wise correspondences) in content items utilizing a trained model (e.g., decision tree, decision forest, etc.) to determine distinctive matches between portions of content items. That is, techniques described herein are directed to training a model and utilizing the model to determine portions of content items that correspond to each other. For the purpose of this discussion, content items can include visual content items including, but not limited to, images, videos, etc. Correspondence estimation (i.e., the task of estimating how portions of content items correspond to each other) can be leveraged for various computer vision tasks such as camera pose estimation, tracking, multi-view stereo estimation, structure-from-motion determination, co-segmentation, retrieval, compression, etc.

Techniques described herein are directed to training a model to determine correspondences, such as global point-wise correspondences, based at least in part on detecting distinctive matches between portions of content items. In at least one example, the model can be a matching algorithm to determine distinctive matches using one or more decision trees. In some examples, the one or more decision trees can be utilized as hash function evaluators. A decision tree is a predictive model that includes a plurality of nodes. In some examples, the decision tree can be a binary decision tree. In such examples, individual nodes of the plurality of nodes can be associated with a decision that has two outcomes. In such examples, the nodes can be arranged in layers associated with a hierarchical order, described below. In other examples, the decision tree can be non-binary. In such examples, individual nodes of the plurality of nodes can be associated with a decision that has more than two outcomes. Non-binary decision trees can resemble a graph. In some examples, the decision tree can be part of a decision forest. A decision forest is a model including two or more decision trees. In at least one example, the model can act as a conditional hash function.

Techniques described herein can process patches associated with content items by causing individual patches to move through a trained model (e.g., decision tree, decision forest, etc.) to determine distinctive matches between patches associated with different content items. In at least one example, two patches associated with different content items can be determined to be corresponding patches based at least in part on determining that the two patches are mapped to, or otherwise associated with, a same terminal node of a trained model. In some examples, two patches associated with different content items can be determined to be corresponding patches based at least in part on determining that the two patches are mapped to, or otherwise associated with, a same terminal node of each trained model in a plurality of trained models. That is, for each trained model in the plurality of trained models, the two patches are mapped to, or otherwise associated with, a same terminal node. Furthermore, the two patches can be determined to be corresponding patches so long as the two patches are distinctive matches in at least one trained model of the plurality of trained models. That is, the two patches can be determined to be corresponding patches so long as no other patch from the content items is mapped to, or otherwise associated with, a same terminal node in each trained model. For the purpose of this discussion, a distinctive match occurs when two or more patches are mapped to, or otherwise associated with, a same terminal node and each patch of the two or more patches is associated with a different content item.

In at least one example, more than two patches from different content items can be determined to be corresponding patches based at least in part on determining that two or more patches, each associated with a different content item, is mapped to, or otherwise associated with, a same terminal node and that no other patch associated with a same content item as any of the two or more patches are mapped to, or otherwise associated with, the same terminal node. Or, more than two patches from different content items can be determined to be corresponding patches based at least in part on determining that two or more patches, each associated with a different content item, are mapped to, or otherwise associated with, a same terminal node of each model of a plurality of models, and that no other patch associated with a same content item as any of the two or more patches is mapped to, or otherwise associated with, the same terminal nodes of the plurality of trained models.

Techniques described herein conserve computational resources by determining correspondence between content items with linear complexity relating to a number of pixels associated with the content items. The techniques described herein determine correspondence without pairwise comparisons or key-point detection, enabling the techniques described herein to determine correspondence more efficiently than conventional approaches. Furthermore, the techniques described herein leverage parallel computation architecture, described below, to reduce the computational complexity of determining correspondence between content items. That is, processing individual patches by causing the individual patches to move through one or more trained models can be performed in parallel by decoupling traversal for each of the individual patches, as described below.

Illustrative Environments

FIG. 1 is a schematic diagram showing an example environment 100 for training a model for determining distinctive matches between content items and utilizing the trained model to determine correspondences between content items based at least in part on determined distinctive matches. More particularly, the example environment 100 can include a service provider 102, one or more networks 104, a user 106, and a device 108 associated with the user 106.

The service provider 102 can be any entity, server(s), platform, etc., that facilitates training models for detecting distinctive matches between portions of content items. For the purposes of this discussion, a distinctive match is when two or more patches that are each associated with different content items are mapped to, or otherwise associated with, a same terminal node of a trained model and no other patch from the different content items is mapped to, or otherwise associated with, the same terminal node. Additionally and/or alternatively, a distinctive match can occur when two or more patches that are each associated with different content items are mapped to, or otherwise associated with, a same terminal node in each trained model in a plurality of trained models and no other patch from the different content items is mapped to, or otherwise associated with, the same terminal node of each trained model.

The service provider 102 can be implemented in a non-distributed computing environment or can be implemented in a distributed computing environment, possibly by running some modules on remotely located devices. As shown, the service provider 102 can include one or more servers 110, which can include one or more processing unit 112 and computer-readable media 114, such as memory. In various examples, the service provider 102 can access content items for training one or more models and can train the one or more models for mapping at least two patches that are in correspondence to a same terminal node of a model and separating the at least two patches from other patches that are not in correspondence. In at least one example, the service provider 102 can provide the trained models to devices (e.g., device 108) associated with users (e.g., user 106). Additionally and/or alternatively, in some examples, the service provider 102 can utilize the trained models for determining correspondences.

In some examples, the network(s) 104 can be any type of network known in the art, such as the Internet. Moreover, the server(s) 110 and/or the device 108 can communicatively couple to the network(s) 104 in any manner, such as by a global or local wired or wireless connection (e.g., local area network (LAN), intranet, etc.). The network(s) 104 can facilitate communication between the server(s) 110 and the device 108 associated with the user 106.

Examples support scenarios where device(s) that can be included in the one or more servers 110 can include one or more computing devices that operate in a cluster or other configuration to share resources, balance load, increase performance, provide fail-over support or redundancy, or for other purposes. Device(s) included in the one or more servers 110 can represent, but are not limited to, desktop computers, server computers, web-server computers, personal computers, mobile computers, laptop computers, tablet computers, wearable computers, implanted computing devices, telecommunication devices, automotive computers, network enabled televisions, thin clients, terminals, game consoles, gaming devices, work stations, media players, digital video recorders (DVRs), set-top boxes, cameras, integrated components for inclusion in a computing device, appliances, or any other sort of computing device. That is, device(s) that can be included in the one or more servers 110 can include any type of computing device having one or more processing units (e.g., processor(s) 112) operably connected to computer-readable media 114 such as via a bus, which in some instances can include one or more of a system bus, a data bus, an address bus, a PCI bus, a Mini-PCI bus, and any variety of local, peripheral, and/or independent buses. In at least one configuration, the computer-readable media 114 of the server(s) 110 can include at least one module that facilitates training one or more models, a training module 116, and a database 118.

Alternatively, or in addition, the functionality described herein can be performed, at least in part, by one or more hardware logic components such as accelerators. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip Systems (SOCs), Complex Programmable Logic Devices (CPLDs), etc. Device(s) that can be included in the one or more server(s) 110 can further include one or more input/output (I/O) interface(s) coupled to the bus to allow device(s) to communicate with other devices such as input peripheral devices (e.g., a keyboard, a mouse, a pen, a game controller, a voice input device, a touch input device, gestural input device, and the like) and/or output peripheral devices (e.g., a display, a printer, audio speakers, a haptic output, and the like). Such network interface(s) can include one or more network interface controllers (NICs) or other types of transceiver devices to send and receive communications over a network. For simplicity, some components are omitted from the illustrated environment.

Processing unit(s) (e.g., processor(s) 112) can represent, for example, a CPU-type processing unit, a GPU-type processing unit, a Field-programmable Gate Array (FPGA), another class of Digital Signal Processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), etc. In various examples, the processing unit(s) (e.g., processor(s) 112) can execute one or more modules and/or processes to cause the server(s) 110 to perform a variety of functions, as set forth above and explained in further detail in the following disclosure. Additionally, each of the processing unit(s) (e.g., processor(s) 112) can possess its own local memory, which also can store program modules, program data, and/or one or more operating systems.

As described above, in at least one configuration, the computer-readable media 114 of the server(s) 110 can include at least one module that facilitates training one or more models, the training module 116. The at least one module can represent pieces of code executing on a computing device. In at least some examples, the training module 116 can be implemented as computer-readable instructions, various data structures, and so forth via at least one processing unit(s) (e.g., processor(s) 112) to configure a device to execute instructions and to perform operations for training one or more models to map at least two patches that are in correspondence to a same terminal node of a model and separating the at least two patches from other patches that are not in correspondence. Additional details associated with training the one or more models are described in FIG. 2, below. Functionality to perform these operations can be included in multiple devices or a single device.

The computer-readable media 114 can also include the database 118. The database 118 can store data that is organized so that it can be accessed, managed, and updated. In at least one example, the database 118 can store content items 120 that can be utilized for training one or more models. As described above, content items 120 can include visual content items including, but not limited to, images, videos, etc.

The database 118 can store one or more trained models 122. As described above, in at least one example, a trained model 122 can be a decision tree. A decision tree is a predictive model that includes a plurality of nodes. In some examples, the decision tree can be a binary decision tree. In such examples, individual nodes of the plurality of nodes can be associated with a decision that has two outcomes. In some examples, the nodes can be arranged in hierarchical layers so that some layers are ranked above other layers. In at least one example, a top layer of nodes can analyze individual patches at a coarser resolution than a lower layer of nodes. In some examples, the lower layers of nodes can analyze individual patches at a finer resolution than layers of nodes above the lower layers. A terminal node is a node where no decision is made. In decision trees, a terminal node can be called a leaf.

In other examples, the decision tree can be non-binary. In such examples, individual nodes of the plurality of nodes can be associated with a decision that has more than two outcomes. Non-binary decision trees can resemble a graph.

In some examples, the decision tree can be part of a decision forest. A decision forest is a model including two or more decision trees. In at least one example, the models described herein can act as a conditional hash function.

As described above, a user 106 can operate a corresponding device 108 (e.g., user devices) to perform various functions associated with the device 108, which can include one or more processing units (e.g., processor(s) 124) and computer-readable media 126. The service provider 102 can provide the trained models 122 to the device 108 associated with user 106. In some examples, a device 108 can have the one or more trained models 122 installed on the device 108 at the time the user 106 acquires the device 108. In other examples, the device 108 can download or otherwise access the one or more trained models 122 from the service provider 102. In at least one example, the user 106 can utilize the device 108 to perform various computer vision tasks such as camera pose estimation, tracking, multi-view stereo estimation, structure-from-motion determination, co-segmentation, retrieval, compression, etc. The computer vision tasks can leverage correspondences determined via the one or more models 122 described herein.

In FIG. 1, device 108 is a wearable device. However, device 108 can represent a diverse variety of device types and is not limited to any particular type of device. Examples of device 108 can include but are not limited to stationary computers, mobile computers, embedded computers, or combinations thereof. Example stationary computers can include desktop computers, work stations, personal computers, thin clients, terminals, game consoles, personal video recorders (PVRs), set-top boxes, or the like. Example mobile computers can include laptop computers, tablet computers, wearable computers, implanted computing devices, telecommunication devices, automotive computers, portable gaming devices, media players, cameras, or the like. Example embedded computers can include network enabled televisions, integrated components for inclusion in a computing device, appliances, microcontrollers, digital signal processors, or any other sort of processing device, or the like.

That is, device 108 can include any type of computing device having one or more processing units (e.g., processor(s) 124) operably connected to computer-readable media 126 such as via a bus, which in some instances can include one or more of a system bus, a data bus, an address bus, a PCI bus, a Mini-PCI bus, and any variety of local, peripheral, and/or independent buses. In at least one configuration, the computer-readable media 126 of device 108 can include one or more modules that determine correspondence between patches of various content items.

Alternatively, or in addition, the functionality described herein can be performed, at least in part, by one or more hardware logic components such as accelerators. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip Systems (SOCs), Complex Programmable Logic Devices (CPLDs), etc. The device 108 can further include one or more input/output (I/O) interface(s) coupled to the bus to allow the device 108 to communicate with other devices such as input peripheral devices (e.g., a keyboard, a mouse, a pen, a game controller, a voice input device, a touch input device, gestural input device, and the like) and/or output peripheral devices (e.g., a display, a printer, audio speakers, a haptic output, and the like). Such network interface(s) can include one or more network interface controllers (NICs) or other types of transceiver devices to send and receive communications over a network. For simplicity, some components are omitted from the illustrated environment.

Processing unit(s) (e.g., processor(s) 124) can represent, for example, a CPU-type processing unit, a GPU-type processing unit, a Field-programmable Gate Array (FPGA), another class of Digital Signal Processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), etc. In various examples, the processing unit(s) (e.g., processor(s) 124) can execute one or more modules and/or processes to cause the server(s) 110 to perform a variety of functions, as set forth above and explained in further detail in the following disclosure. Additionally, each of the processing unit(s) (e.g., processor(s) 124) can possess its own local memory, which also can store program modules, program data, and/or one or more operating systems.

As described above, in at least one configuration, the computer-readable media 126 of the device 108 can include one or more modules that are configured to determine correspondence between content items. The one or more modules can represent pieces of code executing on a computing device. The one or more modules can include a patch determination module 128 and a correspondence determination module 130. In at least one example, the correspondence determination module 130 can store the one or more trained models 122. In alternative examples, the device 108 can include hardware capable of storing the one or more trained models 122 (e.g., decision tree hardware). In such examples, the correspondence determination module 130 can access the one or more trained models 122 from the hardware.

The patch determination module 128 can be configured to determine patches associated with content items. In at least one example, content items can include at least a first content item and a second content item. The first content item and the second content item can be different content items. In at least one example, the second content item can be associated with a geometric or photometric transformation of the first content item.

To determine whether a first content item and a second content item have any correspondence, the patch determination module 128 can extract patches from the first content item and the second content item. Each patch can be associated with a plurality of pixels. In at least one example, a patch can represent a plurality of pixels and properties associated with individual pixels of the plurality of pixels. The properties associated with the individual pixels can include pixel color, pixel intensity levels, etc. In other examples, a patch can represent features extracted from the content items. For instance, as a non-limiting example, a Walsh-Hadamard transform (WHT) can be used as a feature for optical flow tasks. Additional and/or alternative features can be used for additional and/or alternative tasks. In at least one example, the features can be represented as feature vectors.

The correspondence determination module 130 can be configured to process patches and determine whether the patches correspond to one another. The correspondence determination module 130 can access patches associated with a first content item and patches associated with a second content item. The correspondence determination module 130 can process a patch associated with a first content item based at least in part on causing the patch to move through a trained model 122. The correspondence determination module 130 can process a patch associated with a second content item based at least in part on causing the patch to move through the trained model 122. Based at least in part on determining that the patch associated with the first content item and the patch associated with the second content item, are mapped to, or otherwise associated with, a same terminal node in the trained model 122, the correspondence determination module 130 can determine that the patch associated with the first content item and the patch associated with the second content item are corresponding patches. In a non-limiting example where the model is a binary decision tree, the terminal node can be a leaf.

For purposes of this discussion, traversal of trained model 122 can describe the progression of a patch from node to node of the trained model 122. As described above, the trained model 122 can comprise a plurality of nodes. In some examples, the nodes can be arranged in layers associated with a hierarchical structure. That is, a first layer of one or more nodes can be at the top of the hierarchical structure. In at least one example, the first layer of can include a single node. The node can process a patch at a first level of granularity that is coarser than other layers that are lower in the hierarchical structure. In at least one example, the node in the first layer can be considered a parent node.

The parent node can be associated with a split function, described below. The parent node can be associated with two or more child nodes. Each child node can correspond to a different outcome of the split function. The patch can progress to a child node corresponding to the outcome of the split function. Additionally, in at least one example, each child node can be associated with the split function and can be associated with two or more child nodes. This process can be repeated until the patch is mapped to a terminal node. As described above, a terminal node is a node associated with an outcome but not a split function. The layer of nodes immediately preceding the terminal node can process a patch at a level of granularity that is more refined than other layers that are higher in the hierarchical structure. The coarse-to-fine processing can enable the correspondence determination module 130 to process content items having different scales. Additional details associated with traversing a trained model 122 are discussed in FIG. 5, below.

In at least one example, a trained model 122 (e.g., a decision tree) can be a single trained model that can determine correspondence between two patches. A non-limiting example of a single trained model 122 is shown in dashed box 132. In such an example, the correspondence determination module 130 can determine that two patches are corresponding patches based at least in part on determining that a patch associated with a first content item and a patch associated with a second content item are mapped to, or otherwise associated with, a same terminal node in a model and that no other patch associated with the first content item or the second content item is mapped to, or otherwise associated with, same terminal node. A single model prediction can have high precision but low recall. As described above, in some examples, more than two patches can be considered to be corresponding patches based at least in part on each of the patches being associated with a different content item and the two or more patches being distinctive matches.

Additionally or alternatively, a trained model 122 can be a plurality of trained models (e.g., a decision forest) that can determine correspondence between two patches. A non-limiting example of a plurality of trained models is shown in dashed box 134. Each trained model of the plurality of trained models can be independent of and run parallel to the other trained models in the plurality of trained models. Each trained model can consider a different pixel or group of pixels in a patch. In such an example, the correspondence determination module 130 can determine that two patches are corresponding patches based at least in part on determining that a patch associated with the first content item and a patch associated with the second content item are mapped to, or otherwise associated with, a same terminal node of each trained model of the plurality of models and that no other patch associated with the first content item or the second content item is mapped to, or otherwise associated with, the same terminal nodes of each trained model. That is, a plurality of trained models can generate a prediction that can have high precision and high recall. Additional details associated with determining correspondence between patches is described below in FIGS. 3-5. As described above, in some examples, more than two patches can be determined to be distinctive matches.

In at least one example, the correspondence determination module 130 can perform additional processing on distinctively matched patches in a terminal node. In such examples, the correspondence determination module 130 can leverage models (e.g., a six-layer decision tree) to predict whether the distinctively matched patches are true correspondent patches based at least in part on relative motion.

Depending on the exact configuration and type of the server(s) 110 and the device 108, the computer-readable media 114 and computer-readable media 126, respectively, can include computer storage media and/or communication media. Computer storage media can include volatile memory, nonvolatile memory, and/or other persistent and/or auxiliary computer storage media, removable and non-removable computer storage media implemented in any method or technology for storage of information such as computer readable instructions, data structures, program modules, or other data. Computer memory is an example of computer storage media. Thus, computer storage media includes tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, miniature hard drives, memory cards, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast, communication media can embody computer readable instructions, data structures, program modules, or other data in a modulated data signal, such as a carrier wave, or other transmission mechanism. The term "modulated data signal" means a signal that has one or more of its characteristics set or changed in such a manner as to encode information in the signal. Such signals or carrier waves, etc. can be propagated on wired media such as a wired network or direct-wired connection, and/or wireless media such as acoustic, RF, infrared and other wireless media. As defined herein, computer storage media does not include communication media. That is, computer storage media does not include communications media consisting solely of a modulated data signal, a carrier wave, or a propagated signal, per se.

Example Processes

The processes described in FIGS. 2-4 below are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 2:
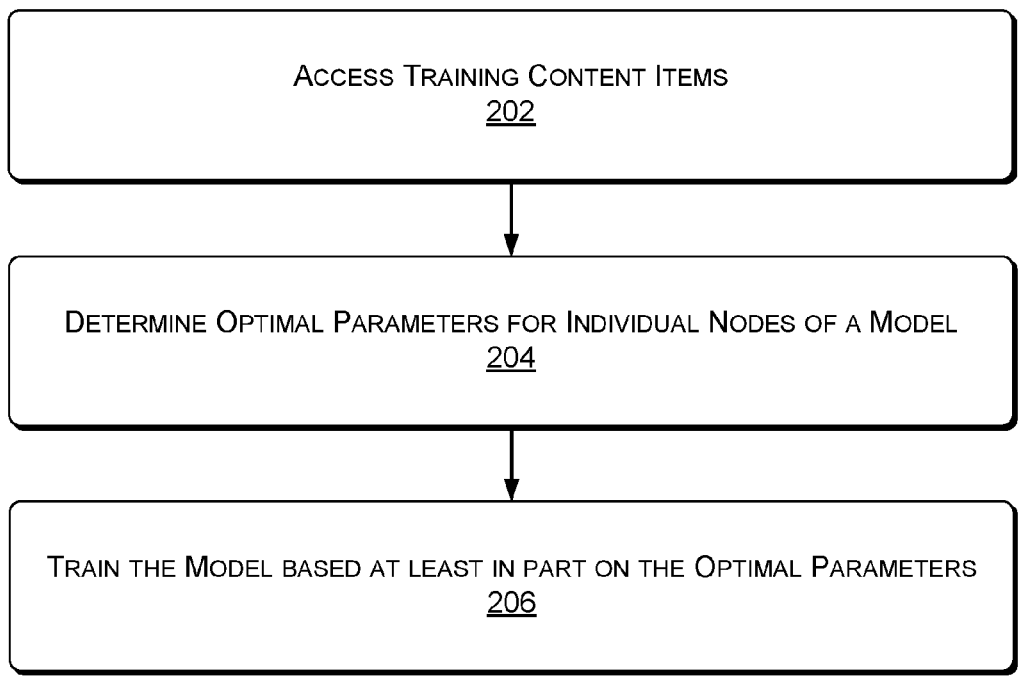
FIG. 2 is a flow diagram that illustrates an example process to train a model for correspondence estimation.

FIG. 2 is a flow diagram that illustrates an example process 200 to train a model for correspondence estimation.

Each trained model in a plurality of trained models can be trained independently on a collection S of training data, described below. As a non-limiting example, each decision tree in a decision forest can be trained independently on a collection S of training data.

Block 202 illustrates accessing training content items 120. The training module 116 can access content items 120 for training a model. The training module 116 can determine a collection S of training data from the content items 120. In at least one example, the content items 120 can include first content items and second content items that are different than the first content items. In at least one example, first content items and the second content items can be different content items such that second content items can be associated with geometric or photometric transformations of the first content items. Additionally and/or alternatively, the content items 120 can include content items 120 other than the first content items and the second content items. The collection S of training data used for training can include a patch x from a first content item used for training, a ground-truth correspondent patch $x_{pos}$ from a second content item used for training, and a negative patch $x_{neg}$ that samples a location around the ground-truth correspondent patch in the second content item with an offset. That is, the collection S of training data can include triplet samples $(x, x_{pos}, x_{neg})$. The patch x and ground-truth correspondent patch $x_{pos}$ are known correspondent patches. That is, patch x and ground-truth correspondent patch $x_{pos}$ are known to have global point-wise correspondence.

Block 204 illustrates determining optimal parameters for individual nodes of a model. As described above, a model can include a plurality of nodes. Each node can be associated with a split function that includes learned parameters θ=(w, τ), where w is a hyper-plane, x represents a threshold value, and t represents a transposition value. The split function is shown below in EQUATION 1. In EQUATION 1, Ø(x) represents features for a patch x being evaluated at the split function.

$$f(x;\theta)=\text{sign}(w^t\emptyset(x)-\tau) \quad \text{EQUATION 1}$$

The training module 116 can determine optimal parameters for the split function to ensure that positive patches (e.g., patch $x_{pos}$) and reference patches (e.g., patch x) are mapped to a same child node and that negative patches (e.g., patch $x_{neg}$) are routed to another child node. A child node can correspond to an outcome of an associated decision node, as described above. To ensure that positive and reference patches are mapped to a same child node and that negative patches are routed to another child node, the training module can determine parameters for each node of the plurality of nodes of the model that maximize a weighted harmonic mean between precision and recall using EQUATION 2 shown below.

$$\max\theta \frac{\text{precision}(S, \theta) * \text{recall}(S, \theta)}{\omega_1 \text{precision}(S, \theta) + \omega_2 \text{recall}(S, \theta)} \quad \text{EQUATION 2}$$

In EQUATION 2, $\omega_1+\omega_2=1$. To maximize precision, $\omega_1=1$ and $\omega_2=0$. To maximize recall, $\omega_1=0$ and $\omega_2=1$. The training module 116 can process a set of values to determine which values between 0 and 1 maximize a weighted harmonic mean between precision and recall.

The training module 116 can determine the parameters in a layer-by-layer manner (i.e., greedy training). That is, the training module 116 can train each layer sequentially starting from a first layer of the individual layers that is a bottom layer in a hierarchical structure and ending at another layer of the individual layers that is a top layer in the hierarchical structure. For each node and the collection S of training data input into each node, the training module 116 can sample hyper-planes and choose a best threshold through line-search for each hyper-plane. For the purpose of this discussion, a hyper-plane can correspond to a model, such as w, in EQUATION 1. A hyper-plane can correspond to a set of coefficients (e.g., $w_1, \ldots, w_n$). The training module 116 can choose a hyper-plane and corresponding threshold that maximize a weighted harmonic mean between precision and recall. For the purpose of this discussion, precision may represent a proportion of corresponding patches determined via the trained models 122 that are relevant (i.e., accurate) and recall may represent a proportion of relevant (i.e., accurate) corresponding patches that are determined via the trained models 122. To further improve the efficiency for training the model, the training module 116 can share features across nodes within same layers and update the threshold for each node.

Block 206 illustrates training the model based at least in part on the optimal parameters. The training module 116 can leverage the parameters corresponding with each node to train the model to determine correspondence between two patches. In at least some examples, the models can be trained based on specific tasks (e.g., task dependent). In other examples, the models can be task independent. Trained models 122 can be stored in the database 118 and accessible by devices (e.g., device 108).

Figure 3:
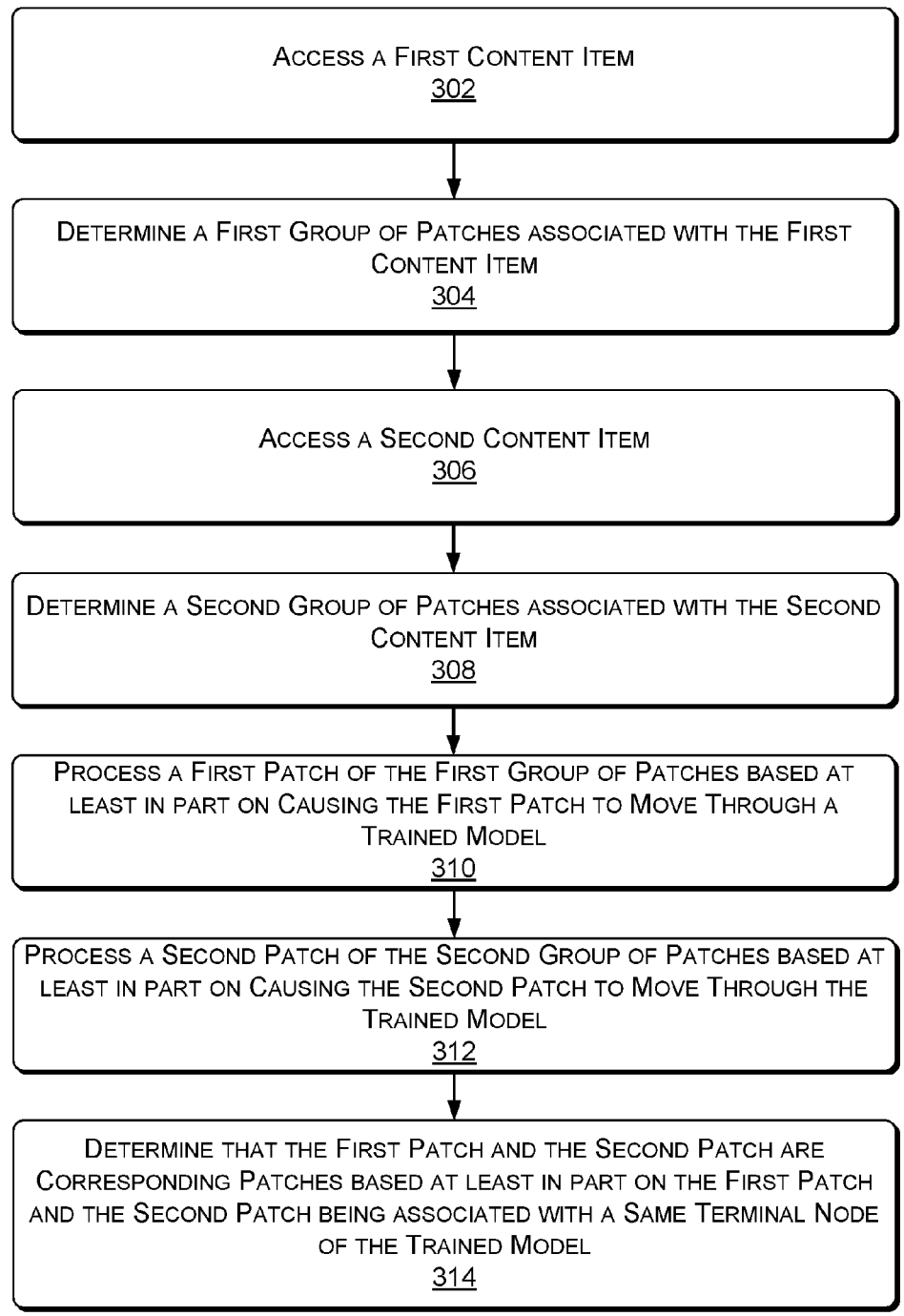
FIG. 3 is a flow diagram that illustrates an example process to determine correspondence between two content items utilizing a trained model.

FIG. 3 is a flow diagram that illustrates an example process 300 to determine correspondence between two content items utilizing a trained model 122.

As described above, the patch determination module 128 can be configured to determine patches from content items. In at least one example, content items can include a first content item and a second content item. As described above, the first content item and the second content item can be different content items. In at least one example, the second content item can be associated with a geometric or photometric transformation of the first content item.

To determine whether a first content item and a second content item have any correspondence, the patch determination module 128 can extract patches from the first content item and the second content item. Each patch can be associated with a plurality of pixels. In at least one example, a patch can represent a plurality of pixels and properties associated with individual pixels of the plurality of pixels. The properties associated with the individual pixels can include pixel color or pixel intensity levels. In other examples, a patch can represent features extracted from the content items. For instance, as a non-limiting example, a Walsh-Hadamard transform (WHT) can be used as a feature for optical flow tasks. Additional and/or alternative features can be used for additional and/or alternative tasks. In at least one example, the features can be represented as feature vectors.

Block 302 illustrates accessing a first content item. Block 304 illustrates determining a first group of patches associated with the first content item. Block 306 illustrates accessing a second content item. Block 308 illustrates determining a second group of patches associated with the second content item.

Block 310 illustrates processing a first patch of the first group of patches based at least in part on causing the first patch to move through a trained model 122. The correspondence determination module 130 can access a first patch associated with the first content item. The correspondence determination module 130 can process the first patch associated with the first content item based at least in part on causing the first patch to move through a trained model 122 (e.g., a decision tree, etc.). That is, the correspondence determination module 130 can provide the first patch to a trained model 122 and the trained model 122 can route the first patch through individual nodes of the trained model 122 based on the split function associated with each node. The split function is shown above in EQUATION 1. The trained model 122 can pass the first patch through the individual nodes of the trained model 122 until the first patch reaches a terminal node. That is, given the first patch x, with center coordinate p from the first image I, the correspondence determination module 130 can pass the first patch x into a trained model 122 (e.g., decision tree T) until the first patch x reaches a terminal node. In at least one example, the identification of the terminal node can be a hash key for the first patch, denoted as T(x).

Block 312 illustrates processing a second patch of the second group of patches based at least in part on causing the second patch to move through the trained model 122. The correspondence determination module 130 can access a second patch associated with the second content item. The correspondence determination module 130 can process the second patch associated with the second content item based at least in part on causing the second patch to move through a trained model 122 (e.g., a decision tree, etc.). That is, the correspondence determination module 130 can provide the second patch to a trained model 122 and the trained model 122 can route the second patch through individual nodes of the trained model 122 based on the split function associated with each node. The split function is shown above in EQUATION 1. The trained model 122 can pass the second patch through the individual nodes of the trained model 122 until the second patch reaches a terminal node. That is, given the second patch x', with center coordinate p' from the second image I', the correspondence determination module 130 can pass the second patch x' into a trained model 122 (e.g., decision tree T) until the second patch x' reaches a terminal node. In at least one example, the identification of the terminal node can be a hash key for the second patch, denoted as T(x').

Block 314 illustrates determining that the first patch and the second patch are corresponding patches based at least in part on the first patch and the second patch being associated with a same terminal node of the trained model 122. Based at least in part on determining that the first patch associated with the first content item and the second patch associated with the second content item are mapped to, or otherwise associated with, a same terminal node in the trained model 122, the correspondence determination module 130 can determine that the patch associated with the first content item and the patch associated with the second content item are corresponding patches. In a non-limiting example where the learned model 122 is a binary decision tree, the terminal node can be a leaf.

In at least one example, after processing each of the patches associated with the first group of patches and each of the patches associated with the second group of patches, the correspondence determination module 130 can determine a group of patches from the first image and a group of patches from the second image that are mapped to, or otherwise associated with, each terminal node in the trained model 122. For instance, for each terminal node j, the correspondence determination module 130 can determine a group of patches from the first image denoted as $S_j$ that are mapped to, or otherwise associated with, terminal node j and a group of patches from the second image denoted as $S'_j$ that are mapped to, or otherwise associated with, the terminal node j. In at least one example, the group of correspondences can be represented by EQUATION 3, shown below.

$$C_T(I,I') = \{(x,x') | T(x)=T(x') \text{ and } |S_{T(x)}|=|S'_{T(x)}|=1\} \quad \text{EQUATION 3}$$

The correspondence determination module 130 can determine that the first patch and the second patch are the only patches in $S_j$ and $S'_j$, and accordingly can determine that the first patch and the second patch are corresponding patches. That is, the correspondence determination module 130 can determine that the first patch and the second patch are corresponding patches based at least in part on determining that they both are mapped to, or otherwise associated with, a same terminal node in a the trained model 122. Furthermore, the correspondence determination module 130 can determine that the first patch and the second patch are corresponding patches based at least in part on determining that no other patch of the first group of patches or the second group of patches are mapped to, or otherwise associated with, the same terminal node as the first patch and the second patch. That is, the first patch and the second patch are a distinctive pair.

In some examples, the process 300 can be considered as a hashing function, where correspondent patches (e.g., the first patch and the second patch) are determined based on finding distinctive matches between patches associated with a first content item and patches associated with a second content item in a hash table.

As described above, FIG. 3 is a flow diagram that illustrates an example process 300 to determine correspondence between two content items utilizing a trained model 122 that includes a single trained model. However, in some examples, utilizing a single trained model 122 can be insufficient to discriminate a large number of distinctive pairs. For instance, in some examples where there are a large number of patches associated with different content items, more than one patch extracted from each content item can be mapped to, or otherwise associated with, a same terminal node in the trained model 122. In a single trained model 122, the inclusion of a patch other than the first patch and the second patch can cause the correspondence determination module 130 to determine that patches do not correspond. That is, single trained models 122 can have high precision but low recall.

In at least one example, the trained model 122 can be a plurality of models and the correspondence determination module 130 can process patches by causing the patches to move through multiple trained models in the plurality of trained models. For instance, when a trained model is a decision tree, the correspondence determination module 130 can cause patches to move through individual decision trees in a decision forest. Each decision tree in the decision forest can process a different pixel or group of pixels within a patch. In such examples, the correspondence determination module 130 can determine that a first patch associated with a first content item and a second patch associated with a second content item are corresponding patches based at least in part on determining that the first patch and the second patch are mapped to, or otherwise associated with, a same terminal node in each trained model in the plurality of trained models and that there is not any other patch associated with the first content item or the second content item that reaches exactly the same corresponding terminal nodes of each trained model. As described above, each decision tree in the decision forest can run independently of the other decision trees in the decision forest and in parallel.

That is, in at least one example, given two content items 1 and 1' and a plurality of trained models associated with the trained model 122 denoted as F, the group of correspondence can be formulated as shown in EQUATION 4.

$$C_F(I,I')=\{(x,x')|F(x)=F(x') \text{ and } |S_{F(x)}|=|S'_{F(x)}|=1\} \quad \text{EQUATION 4}$$

In such an example, F(x) is a sequence of terminal nodes $\{j_1, \ldots, j_T\}$ where x falls into the plurality of models F and $S_L$ represents a group of patches that fall into the terminal nodes sequence L. In at least one example, the terminal nodes in sequence L can be ordered. In other examples, the terminal nodes in sequence L may not be ordered. In an example where the plurality of models includes T trees and L layers for each model, the number of leaves can be represented by $2^{L(T-1)}$.

Figure 4:
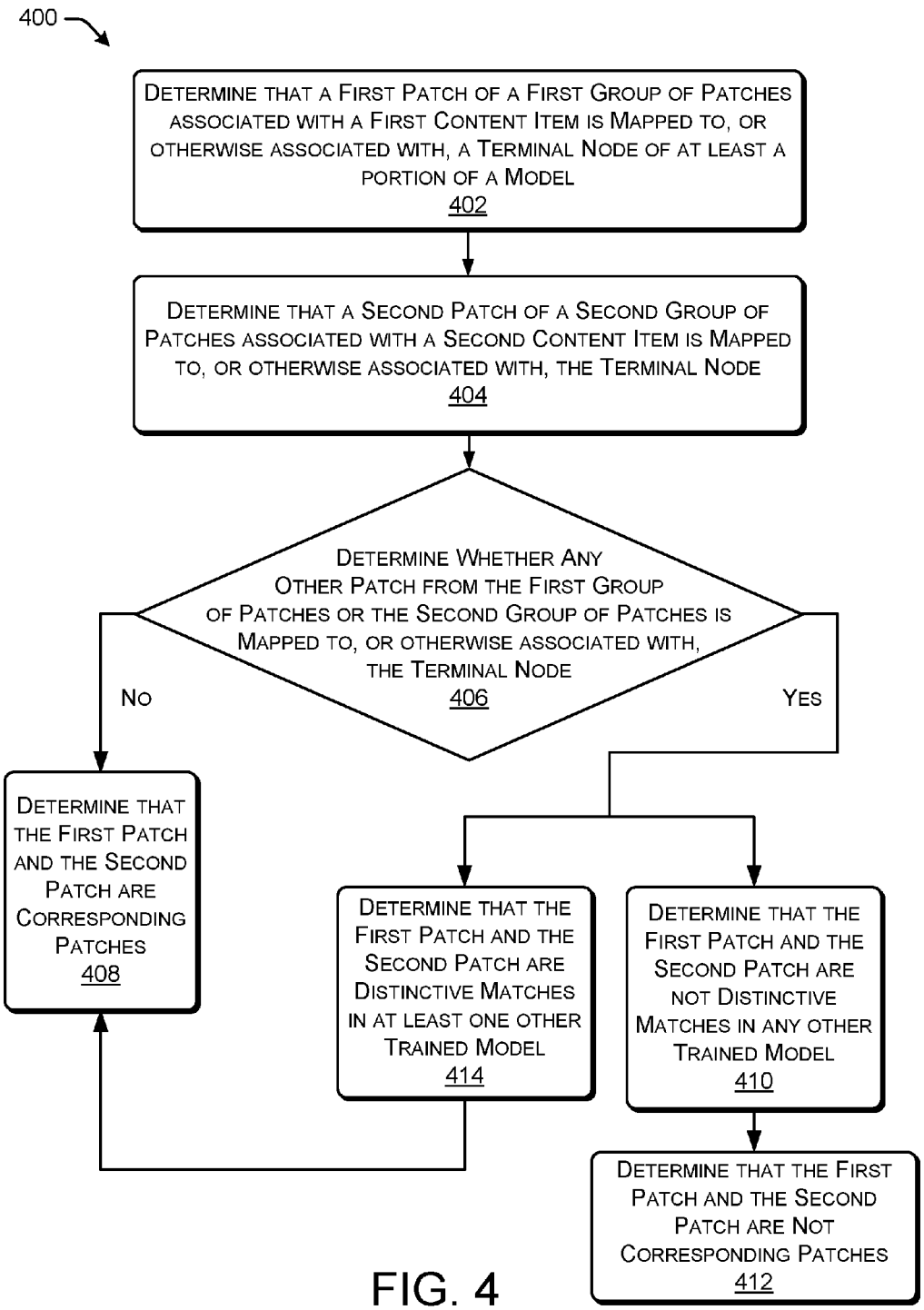
FIG. 4 is a flow diagram that illustrates additional details of an example process to determine correspondence between two content items utilizing a trained model.

FIG. 4 is a flow diagram that illustrates additional details of an example process 400 to determine correspondence between two content items utilizing a trained model 122.

In at least one example, after processing each of the patches associated with a first group of patches from a first content item and each of the patches associated with a second group of patches from a second content item, the correspondence determination module 130 can determine a group of patches from the first content item and a group of patches from the second content item that are mapped to, or otherwise associated with, a same terminal node of at least a portion of a trained model 122. Block 402 illustrates determining that a first patch of a first group of patches associated with the first content item is mapped to, or otherwise associated with, a terminal node of at least a portion of a trained model 122 (e.g., a decision tree of a decision forest). Block 404 illustrates determining that a second patch of a second group of patches associated with the second content item is mapped to, or otherwise associated with, the terminal node.

Block 406 illustrates determining whether any other patch from the first group of patches or the second group of patches is mapped to, or otherwise associated with, the terminal node. Based at least in part on the correspondence determination module 130 determining that the first patch and the second patch are a distinctive match with respect to the terminal node, the correspondence determination module 130 can determine that the first patch and the second patch are corresponding patches. That is, the correspondence determination module 130 can determine that the first patch and the second patch are a distinctive pair and accordingly, are corresponding patches, as illustrated in Block 408.

In alternative examples, the correspondence determination module 130 can determine that the first patch and the second patch are not a distinctive pair. That is, the correspondence determination module 130 can determine that at least one other patch associated with the first content item or the second content item is mapped to, or otherwise associated with, a same terminal node as the first patch and the second patch. In such examples, if the trained model 122 consists of a single trained model (e.g., a single decision tree), the correspondence determination module 130 can determine that the first patch and the second patch are not corresponding patches. Or, if the trained model 122 is a plurality of trained models and the portion of the trained model 122 through which the first patch and the second patch pass corresponds to an individual trained model of the plurality of trained models (e.g., a single decision tree in a decision forest), the correspondence determination module 130 can consider other individual trained models in the plurality of trained models to determine whether the first patch and the second patch are distinctive pairs in any other trained model. That is, in at least some examples the correspondence determination module 130 can determine that the first patch and the second patch are not distinctive in any other trained model in the plurality of trained models, as illustrated in Block 410. In such examples, the correspondence determination module 130 can determine that the first patch and the second patch are not corresponding patches, as illustrated in Block 412.

In other examples, if the trained model 122 is a plurality of trained models, the correspondence determination module 130 can consider other trained models in the plurality of trained models to determine whether the first patch and the second patch are distinctive pairs in any other trained model. In at least one example, the correspondence determination module 130 can determine that the first patch and the second patch are distinctive in at least one other trained model of the plurality of trained models, as illustrated in Block 414. In such examples, the correspondence determination module 130 can determine that the first patch and the second patch are corresponding patches, as illustrated in Block 408.

Figure 5:
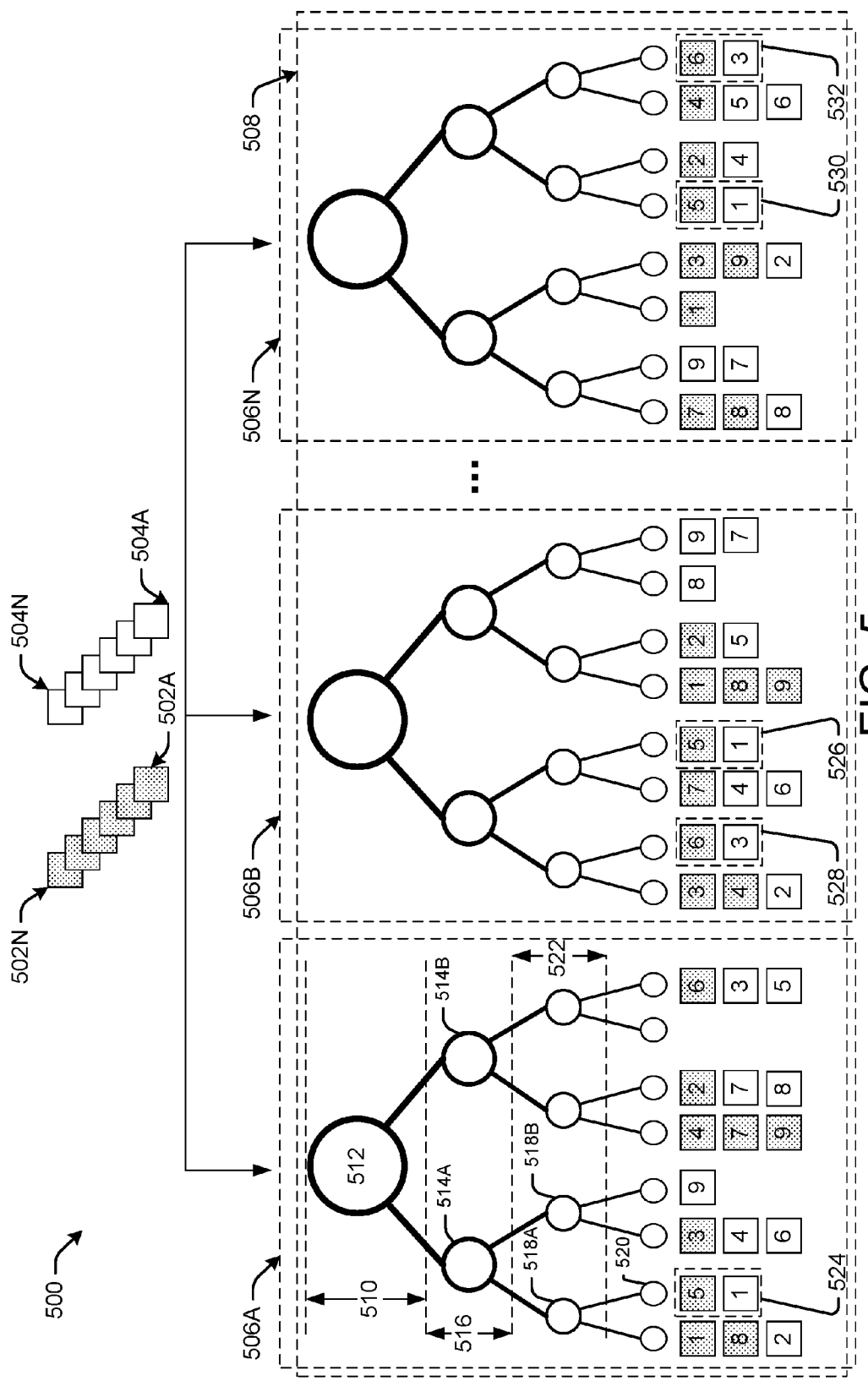
FIG. 5 is a schematic diagram that illustrates an example decision tree forest and an example process to determine correspondence between two content items utilizing the decision tree forest.

FIG. 5 is a schematic diagram 500 that illustrates an example decision tree forest and an example process to determine correspondence between two content items utilizing the decision tree forest. As described above, the patch determination module 128 can be configured to determine patches associated with content items utilizing a trained model 122, such as the decision tree forest illustrated in FIG. 5.

As described above, in at least one example, content items can include a first content item and a second content item. To determine whether a first content item and a second content item have any correspondence, the patch determination module 128 can extract patches from the first content item and the second content item. In FIG. 5, patches 502A-N are associated with the first content item and patches 504A-N are associated with the second content item. The first content item and the second content item can be images, videos, etc. The first content item and the second content item can be different content items. In at least one example, the second content item can be associated with a geometric or photometric transformation of the first content item.

The correspondence determination module 130 can process individual patches 502A-N that are associated with the first content item and individual patches 504A-N that are associated with the second content item by causing the individual patches 502A-N that are associated with the first content item and individual patches 504A-N that are associated with the second content item to move through a trained model 122. As described above, a trained model 122 can comprise a single model (e.g., a decision tree) or a plurality of models (e.g., a decision forest). FIG. 5 depicts three individual decision trees 506A, 506B, and 506N that make up a decision forest 508. In additional and/or alternative examples, any number of decision trees can make up a decision forest 508. Each decision tree 506A, 506B, and/or 506N can process patches independently of, and parallel to, the other decision trees 506A, 506B, and/or 506N in the decision forest 508.

In at least one example, the correspondence determination module 130 can access a first patch 502A of the first group of patches (e.g., 502A-N) and a second patch 504A of the second group of patches (e.g., 504A-N). The correspondence determination module 130 can process the first patch 502A and the second patch 504A based at least in part on causing the first patch 502A and the second patch 504A to move through a first decision tree 506A. That is, the correspondence determination module 130 can provide the first patch 502A and the second patch 504A to a trained model 122 and the first decision tree 506A can route the first patch 502A and the second patch 504A through individual nodes of the decision tree 506A based on the split function associated with each node. The split function is shown above in EQUATION 1.

As described above, traversal of a trained model 122 can describe the progression of a patch from node to node of the trained model 122. As described above, the trained model 122 can comprise a plurality of nodes. In some examples, the nodes can be arranged in layers associated with a hierarchical structure. That is, a first layer of one or more nodes can be at the top of the hierarchical structure. Layer 510 is a non-limiting example of a first layer, which can include a single node 512. The node can process a patch at a first level of granularity that is coarser than other layers that are lower in the hierarchical structure. In at least one example, the node in first layer can be considered a parent node. That is, node 512 can represent a parent node. The parent node can be associated with a split function such as EQUATION 1, described above.

A parent node (e.g., 512) can be associated with two or more child nodes (e.g., 514A and 514B). The child nodes can be associated with a second layer 516. In some examples, the child nodes may be considered branch nodes. Each child node can correspond to a different outcome of the split function. A patch can progress to a child node corresponding to the outcome of the split function. Additionally, in at least one example, each child node can be associated with the split function and can be associated with two or more child nodes (e.g., 518A and 518B). This process can be repeated until the patch is mapped to, or otherwise associated with, a terminal node 520. As described above, a terminal node 520 is a node associated with an outcome but not a split function. The layer of nodes immediately preceding the terminal node (e.g., layer 522) can process a patch at a level of granularity that is more refined than other layers that are higher in the hierarchical structure (e.g., layer 510, layer 516, etc.). The coarse-to-fine processing can enable the correspondence determination module 130 to process content items having different scales.

Based at least in part on determining that the first patch 502A and the second patch 504A are mapped to, or otherwise associated with, a same terminal node in a portion of the model (e.g., decision tree 506A), the correspondence determination module 130 can determine that the first patch 502A and the second patch 504A are corresponding patches. In a non-limiting example where the model is a binary decision tree, the terminal node can be a leaf. As illustrated in FIG. 5, a first patch (patch 5) and a second patch (patch 1) are mapped to, or otherwise associated with, a same terminal node of decision tree 506A, as shown in dashed box 524. No other patch associated with the first content item or the second content item are mapped to, or otherwise associated with, the same terminal node of decision tree 506A. Accordingly, the first patch (patch 5) and the second patch (patch 1) can be considered a distinctive pair and corresponding patches.

In an alternative example, as illustrated in FIG. 5, patch 6, which is associated with the first content item, and patch 3 and patch 5, which are associated with a second content item, are mapped to, or otherwise associated with, a same terminal node as the decision tree 506A. In an example where the trained model 122 is a single model (e.g., a single decision tree 506A), the correspondence determination module 130 may not be able to determine whether patch 6 and patch 3 are corresponding patches or patch 6 and patch 5 are corresponding patches. Accordingly, the correspondence determination module 130 can determine that neither patch 6 and patch 3 or patch 6 and patch 5 are corresponding patches.

However, in at least one example, the trained model 122 can be a plurality of models (e.g., decision forest 508), as illustrated in FIG. 5, and each individual model (e.g., decision tree 506A, decision tree 506B, and decision tree 506N) in the plurality of models can process different pixels of each of the patches. The correspondence determination module 130 can process patches by causing the patches to move through each of the decision trees (e.g., decision tree 506A, decision tree 506B, and/or decision tree 506N) in the decision forest 508. In such examples, the correspondence determination module 130 can determine that a first patch (e.g., patch 502A) associated with a first content item and a second patch (e.g., patch 504A) associated with a second content item are corresponding patches based at least in part on determining that the first patch and the second patch are mapped to, or otherwise associated with, a same terminal node of each of the models (e.g., decision tree 506A, decision tree 506B, and decision tree 506N) in the plurality of models and that there is not any other patch associated with the first content item or the second content item that reach exactly the same terminal nodes of each decision tree (e.g., decision tree 506A, decision tree 506B, and decision tree 506N).

With respect to decision tree 506B, a first patch (patch 5) and a second patch (patch 1) are mapped to, or otherwise associated with, a same terminal node of decision tree 506B, as shown in dashed box 526. No other patch associated with the first content item or the second content item is mapped to, or otherwise associated with, the same terminal node in the decision tree 506B. Accordingly, the first patch (patch 5) and the second patch (patch 1) can be considered a distinctive pair and corresponding patches. Similarly, a first patch (patch 6) and a second patch (patch 3) are mapped to, or otherwise associated with, a same terminal node in the decision tree 506B, as shown in dashed box 528. No other patch associated with the first content item or the second content item is mapped to, or otherwise associated with, the same terminal node in the model 506B. Accordingly, the first patch (patch 6) and the second patch (patch 3) can be considered a distinctive pair and corresponding patches.

With respect to decision tree 506N, a first patch (patch 5) and a second patch (patch 1) are mapped to, or otherwise associated with, a same terminal node in the model (e.g., decision tree 506N), as shown in dashed box 530. No other patch associated with the first content item or the second content item is mapped to, or otherwise associated with, the same terminal node in the model (e.g., decision tree 506N). Accordingly, the first patch (patch 5) and the second patch (patch 1) can be considered a distinctive pair and corresponding patches. Similarly, a first patch (patch 6) and a second patch (patch 3) are mapped to, or otherwise associated with, a same terminal node in the model (e.g., decision tree 506N), as shown in dashed box 532. No other patch associated with the first content item or the second content item is mapped to, or otherwise associated with, the same terminal node in the model (e.g., decision tree 506N). Accordingly, the first patch (patch 6) and the second patch (patch 3) can be considered a distinctive pair and corresponding patches.

As illustrated in FIG. 5, the correspondence determination module 130 can determine that a first patch (patch 6)

associated with a first content item and a second patch (patch 3) associated with a second content item are corresponding patches based at least in part on determining that the first patch (patch 6) and the second patch (patch 3) are mapped to, or otherwise associated with, a same terminal node of each of the decision trees (e.g., decision tree 506A, decision tree 506B, and decision tree 506N) in the decision forest 508 and that there is not any other patch associated with the first content item or the second content item that reaches exactly the same corresponding terminal nodes of each decision tree (e.g., decision tree 506A, decision tree 506B, and decision tree 506N). That is, because patch 5 associated with the second content item is not mapped to, or otherwise associated with, the same terminal nodes as patch 6 in each decision tree (e.g., decision tree 506A, decision tree 506B, and decision tree 506N) of the plurality of decision trees 508, the correspondence determination module 130 can determine that patch 6 and patch 3 are corresponding patches.

Example Clauses

A. A system comprising: one or more processors; and memory that stores one or more modules that are executable by the one or more processors to cause the system to perform operations comprising: determining a first group of patches associated with a first content item; processing a first patch of the first group of patches based at least in part on causing the first patch to move through a decision tree; determining a second group of patches associated with a second content item; processing a second patch of the second group of patches based at least in part on causing the second patch to move through the decision tree; determining that the first patch and the second patch are mapped to a same leaf of the decision tree; and determining that the first patch and the second patch are corresponding patches based at least in part on determining that the first patch and the second patch are mapped to the same leaf of the decision tree.

B. The system as paragraph A recites, the operations further comprising: determining that no other patch of the first group of patches or the second group of patches is mapped to the same leaf; and determining that the first patch and the second patch are corresponding patches based at least in part on determining that no other patch of the first group of patches or the second group of patches is mapped to the same leaf.

C. The system as any of paragraphs A or B recite, wherein the decision tree is a first decision tree in a plurality of decision trees and other decision trees in the plurality of decision trees process the first patch and the second patch independently of the first decision tree.

D. The system as paragraph C recites, wherein: the first decision tree evaluates a first pixel in the first patch and a second pixel in the second patch, the first pixel and the second pixel being located in a same first position in the first patch and the second patch; and a second decision tree in the plurality of decision trees evaluates a third pixel in the first patch and a fourth pixel in the second patch, the third pixel and the fourth pixel being located in a same second position in the first patch and the second patch that is different from the first position.

E. The system as paragraph C recites, the operations further comprising: determining that at least one other patch of the first group of patches or the second group of patches is mapped to the same leaf, the leaf being a first leaf; determining that the first patch and the second patch are mapped to a same second leaf of a second decision tree; determining that no other patch of the first group of patches or the second group of patches is mapped to the same second leaf; and determining that the first patch and the second patch are corresponding patches based at least in part on determining that no other patch of the first group of patches or the second group of patches is mapped to the same second leaf.

F. The system as any of paragraphs A-E recite, wherein: the decision tree comprises a plurality of nodes arranged in a hierarchical order; and each node of the plurality of nodes is associated with a split function including learned parameters.

G. The system as paragraph F recites, wherein the learned parameters maximize a weighted harmonic mean between precision and recall.

H. A method for conserving computational resources by determining correspondence between content items with a linear complexity relating to a number of pixels associated with the content items, the method comprising: determining a first group of patches associated with a first content item of the content items; processing a first patch of the first group of patches based at least in part on causing the first patch to move through a plurality of models; determining a second group of patches associated with a second content item of the content items; processing a second patch of the second group of patches based at least in part on causing the second patch to move through the plurality of models; determining that the first patch and the second patch are associated with a same terminal node of each model of the plurality of models; and based at least in part on determining that the first patch and the second patch are associated with the same terminal node of each model, determining that the first patch and the second patch are corresponding patches.

I. A method as paragraph H recites, wherein each model is a binary decision tree comprising a plurality of nodes arranged in layers associated with a hierarchical order.

J. A method as paragraph I recites, further comprising: processing, via a first layer of nodes of the plurality of nodes, pixels associated with the first patch or features associated with the first patch at a first resolution; and processing, via a second layer of nodes of the plurality of nodes, the pixels associated with the first patch or the features associated with the first patch at a second resolution, the second resolution being a more refined resolution than the first resolution, the second layer of nodes being associated with a hierarchical level below the first layer of nodes.

K. A method as any of paragraphs H-J recite, wherein each model comprises a non-binary decision tree comprising a plurality of nodes.

L. A method as any of paragraphs H-K recite, wherein each model comprises a hashing function, and determining that the first patch and the second patch are corresponding patches is based at least in part on a hash table.

M. A method as any of paragraphs H-L recite, wherein the first patch comprises pixels of the first content item and properties associated with individual ones of the pixels.

N. A method as any of paragraphs H-M recite, wherein the first patch comprises one or more features extracted from the first content item.

O. A method as any of paragraphs H-N recite, further comprising: determining that no other patch of the first group of patches or the second group of patches is associated with the same terminal node of each model; and determining that the first patch and the second patch are corresponding patches further based at least in part on determining that no other patch of the first group of patches or the second group of patches is associated with the same terminal node of each model.

P. A method as any of paragraphs H-O recite, further comprising applying each model of the plurality of models to the first patch and the second patch in parallel.

Q. One or more computer-readable media encoded with instructions that, when executed by a processor, configure a computer to perform a method as any of paragraphs H-P recite.

R. A device comprising one or more processors and one or more computer readable media encoded with instructions that, when executed by the one or more processors, configure a computer to perform a computer-implemented method as any of paragraphs H-P recite.

S. A method for conserving computational resources by determining correspondence between content items with a linear complexity relating to a number of pixels associated with the content items, the method comprising: means for determining a first group of patches associated with a first content item of the content items; means for processing a first patch of the first group of patches based at least in part on causing the first patch to move through a plurality of models; means for determining a second group of patches associated with a second content item of the content items; means for processing a second patch of the second group of patches based at least in part on causing the second patch to move through the plurality of models; means for determining that the first patch and the second patch are associated with a same terminal node of each model of the plurality of models; and means for, based at least in part on determining that the first patch and the second patch are associated with the same terminal node of each model, determining that the first patch and the second patch are corresponding patches.

T. A method as paragraph S recites, wherein each model is a binary decision tree comprising a plurality of nodes arranged in layers associated with a hierarchical order.

U. A method as paragraph T recites, further comprising: means for processing, via a first layer of nodes of the plurality of nodes, pixels associated with the first patch or features associated with the first patch at a first resolution; and means for processing, via a second layer of nodes of the plurality of nodes, the pixels associated with the first patch or the features associated with the first patch at a second resolution, the second resolution being a more refined resolution than the first resolution, the second layer of nodes being associated with a hierarchical level below the first layer of nodes.

V. A method as any of paragraphs S-U recite, wherein each model comprises a non-binary decision tree comprising a plurality of nodes.

W. A method as any of paragraphs S-V recite, wherein each model comprises a hashing function, and determining that the first patch and the second patch are corresponding patches is based at least in part on a hash table.

X. A method as any of paragraphs S-W recite, wherein the first patch comprises pixels of the first content item and properties associated with individual ones of the pixels.

Y. A method as any of paragraphs S-X recite, wherein the first patch comprises one or more features extracted from the first content item.

Z. A method as any of paragraphs S-Y recite, further comprising: means for determining that no other patch of the first group of patches or the second group of patches is associated with the same terminal node of each model; and means for determining that the first patch and the second patch are corresponding patches further based at least in part on determining that no other patch of the first group of patches or the second group of patches is associated with the same terminal node of each model.

AA. A method as any of paragraphs S-Z recite, further comprising applying each model of the plurality of models to the first patch and the second patch in parallel.

AB. A system comprising: one or more processors; and memory that stores one or more modules that are executable by the one or more processors to cause the system to perform operations comprising: accessing training content items; training a model for mapping at least two patches extracted from the training content items that are in correspondence to a same terminal node of the model and separating the at least two patches from other patches extracted from the training content items that are not in correspondence, the training comprising: determining parameters for an individual node of a plurality of nodes of the model that maximize a weighted harmonic mean between precision and recall; determining, based at least in part on the parameters, a threshold for individual layers of nodes of the plurality of nodes; and training the model based at least in part on the parameters and the threshold.

AC. The system as paragraph AB recites, wherein the training content items include a patch from a first training content item, a ground-truth correspondent patch from a second training content item, and a negative patch that samples a location around the ground-truth correspondent patch in the second training content item with an offset.

AD. The system as paragraphs AB or AC recite, the operations further comprising: sharing features across the individual layers of the nodes; and updating the threshold based at least in part on sharing the features.

AE. The system as any of paragraphs AB-AD recite, wherein the plurality of nodes are arranged in a hierarchical structure and training the model is based on training each of the individual layers sequentially starting from a layer of the individual layers that is a bottom layer in the hierarchical structure and ending at another layer of the individual layers that is a top layer in the hierarchical structure.

CONCLUSION

Although the subject matter has been described in language specific to structural features and/or methodological acts, it is to be understood that the subject matter defined in the appended claims is not necessarily limited to the specific features or acts described. Rather, the specific features and acts are described as illustrative forms of implementing the claims.

Conditional language such as, among others, "can," "could," "might" or "can," unless specifically stated otherwise, are understood within the context to present that certain examples include, while other examples do not necessarily include, certain features, elements and/or steps. Thus, such conditional language is not generally intended to imply that certain features, elements and/or steps are in any way required for one or more examples or that one or more examples necessarily include logic for deciding, with or without input or prompting, whether certain features, elements and/or steps are included or are to be performed in any particular example. Conjunctive language such as the phrase "at least one of X, Y or Z," unless specifically stated otherwise, is to be understood to present that an item, term, etc. can be either X, Y, or Z, or a combination thereof.

What is claimed is:
1. A system comprising:
one or more processors; and memory that stores one or more modules that are executable by the one or more processors to cause the system to perform operations comprising:
  determining a first group of patches associated with a first content item;
  processing a first patch of the first group of patches based at least in part on causing the first patch to move through a decision tree;
  determining a second group of patches associated with a second content item;
  processing a second patch of the second group of patches based at least in part on causing the second patch to move through the decision tree;
  determining that the first patch and the second patch are mapped to a same leaf of the decision tree; and
  determining that the first patch and the second patch are corresponding patches based at least in part on determining that the first patch and the second patch are mapped to the same leaf of the decision tree.

2. The system as claim 1 recites, the operations further comprising:
  determining that no other patch of the first group of patches or the second group of patches is mapped to the same leaf; and
  determining that the first patch and the second patch are corresponding patches based at least in part on determining that no other patch of the first group of patches or the second group of patches is mapped to the same leaf.

3. The system as claim 1 recites, wherein the decision tree is a first decision tree in a plurality of decision trees and other decision trees in the plurality of decision trees process the first patch and the second patch independently of the first decision tree.

4. The system as claim 3 recites, wherein:
  the first decision tree evaluates a first pixel in the first patch and a second pixel in the second patch, the first pixel and the second pixel being located in a same first position in the first patch and the second patch; and
  a second decision tree in the plurality of decision trees evaluates a third pixel in the first patch and a fourth pixel in the second patch, the third pixel and the fourth pixel being located in a same second position in the first patch and the second patch that is different from the first position.

5. The system as claim 3 recites, the operations further comprising:
  determining that at least one other patch of the first group of patches or the second group of patches is mapped to the same leaf, the leaf being a first leaf;
  determining that the first patch and the second patch are mapped to a same second leaf of a second decision tree;
  determining that no other patch of the first group of patches or the second group of patches is mapped to the same second leaf; and
  determining that the first patch and the second patch are corresponding patches based at least in part on determining that no other patch of the first group of patches or the second group of patches is mapped to the same second leaf.

6. The system as claim 1 recites, wherein:
  the decision tree comprises a plurality of nodes arranged in a hierarchical order; and
  each node of the plurality of nodes is associated with a split function including learned parameters.

7. The system as claim 6 recites, wherein the learned parameters maximize a weighted harmonic mean between precision and recall.

8. A method comprising:
  determining a first group of patches associated with a first content item;
  processing a first patch of the first group of patches based at least in part on causing the first patch to move through a plurality of models;
  determining a second group of patches associated with a second content item;
  processing a second patch of the second group of patches based at least in part on causing the second patch to move through the plurality of models;
  determining that the first patch and the second patch are associated with a same terminal node of each model of the plurality of models; and
  based at least in part on determining that the first patch and the second patch are associated with the same terminal node of each model, determining that the first patch and the second patch are corresponding patches.

9. A method as claim 8 recites, wherein each model is a binary decision tree comprising a plurality of nodes arranged in layers associated with a hierarchical order.

10. A method as claim 9 recites, further comprising:
  processing, via a first layer of nodes of the plurality of nodes, pixels associated with the first patch or features associated with the first patch at a first resolution; and
  processing, via a second layer of nodes of the plurality of nodes, the pixels associated with the first patch or the features associated with the first patch at a second resolution, the second resolution being a more refined resolution than the first resolution, the second layer of nodes being associated with a hierarchical level below the first layer of nodes.

11. A method as claim 8 recites, wherein each model comprises a non-binary decision tree comprising a plurality of nodes.

12. A method as claim 8 recites, wherein each model comprises a hashing function, and determining that the first patch and the second patch are corresponding patches is based at least in part on a hash table.

13. A method as claim 8 recites, wherein the first patch comprises pixels of the first content item and properties associated with individual ones of the pixels.

14. A method as claim 8 recites, wherein the first patch comprises one or more features extracted from the first content item.

15. A method as claim 8 recites, further comprising:
  determining that no other patch of the first group of patches or the second group of patches is associated with the same terminal node of each model; and
  determining that the first patch and the second patch are corresponding patches further based at least in part on determining that no other patch of the first group of patches or the second group of patches is associated with the same terminal node of each model.

16. A method as claim 8 recites, further comprising applying each model of the plurality of models to the first patch and the second patch in parallel.

17. A system comprising:
  one or more processors; and
  memory that stores one or more modules that are executable by the one or more processors to cause the system to perform operations comprising:
    accessing training content items;

training a model for mapping at least two patches extracted from the training content items that are in correspondence to a same terminal node of the model and separating the at least two patches from other patches extracted from the training content items that are not in correspondence, the training comprising:
  determining parameters for an individual node of a plurality of nodes of the model that maximize a weighted harmonic mean between precision and recall;
  determining, based at least in part on the parameters, a threshold for individual layers of nodes of the plurality of nodes; and
  training the model based at least in part on the parameters and the threshold.

18. The system as claim 17 recites, wherein the training content items include a patch from a first training content item, a ground-truth correspondent patch from a second training content item, and a negative patch that samples a location around the ground-truth correspondent patch in the second training content item with an offset.

19. The system as claim 17 recites, the operations further comprising:
  sharing features across the individual layers of the nodes; and
  updating the threshold based at least in part on sharing the features.

20. The system as claim 17 recites, wherein the plurality of nodes are arranged in a hierarchical structure and training the model is based on training each of the individual layers sequentially starting from a layer of the individual layers that is a bottom layer in the hierarchical structure and ending at another layer of the individual layers that is a top layer in the hierarchical structure.

* * * * *